United States Patent Office 2,717,893
Patented Sept. 13, 1955

2,717,893

PURIFICATION OF STREPTOMYCIN

David A. Johnson, North Syracuse, N. Y., assignor to Bristol Laboratories Inc., Syracuse, N. Y., a corporation of New York No Drawing. Application September 23, 1953, Serial No. 381,990

6 Claims. (Cl. 260—210)

This invention relates to a process of purification of streptomycin and, more particularly, to regeneration of purified streptomycin by reaction in acid of aromatic aldehydes with streptomycyltetrahydroimidazoles.

Throughout this specification and claims, the name "streptomycyl" is used to represent the radical attached to the aldehyde group $$(-\overset{H}{C}=O)$$

in the widely-known antibiotic streptomycin. Thus, the antibiotic streptomycin is represented by the formula "Streptomycyl-CHO" or as "Strep.-CHO" (see U. S. Patent #2,607,770) rather than by the customary formula. An ordinary salt, such as the sulfate, is represented as "Streptomycyl-CHO·1½ H$_2$SO$_4$" or as "2 Streptomycyl-CHO·3H$_2$SO$_4$"

Present processes for the purification of streptomycin are rendered cumbersome, expensive and inefficient by the great water-solubility of the most useful streptomycin salt, that is, the sulfate. The reduction of contamination with metals, called "ash content," is particularly difficult; thus both sodium sulfate and streptomycin sulfate are highly soluble in water and insoluble in methanol. Purification by passage over ion-exchange columns often actually increases ash content. The water-insoluble 1,3-substituted-2-streptomycyl-tetrahydroimidazoles disclosed in the application of my colleague, Lee C. Cheney, of Serial Number 338,129, provide an effective method of separating streptomycin from contaminants, e. g. sodium sulfate, by precipitation of the former in the form of a 1,3-substituted-2-streptomycyl-tetrahydroimidazole, leaving the impurity behind in the aqueous solution.

It is the object of the present invention to provide methods for regeneration of streptomycin, in solution or as an isolated solid, which are superior to the method (previously disclosed by Lee C. Cheney in his application S. N. 338,129) of acid regeneration from 1,3-disubstituted-2-streptomycyltetrahydroimidazoles.

It is a further object of the present invention to provide methods for the quantitative removal of the N,N'-disubstituted ethylenediamine formed in the acid regeneration of 1,3-disubstituted-2-streptomycyl-tetrahydroimidazoles.

These objectives have been achieved and there is now discovered, according to the present invention, the process of reacting a 2-streptomycyltetrahydroimidazole in aqueous acid with an aromatic aldehyde to precipitate 2-aryl-tetrahydroimidazole, and separating the solution containing soluble streptomycin salt.

There is further discovered, according to the present invention, the process of reacting 1,3-dibenzyl-2-streptomycyl-tetrahydroimidazole in about one equivalent aqueous mineral acid with substantially one equivalent of benzaldehyde to precipitate 1,3-dibenzyl-2-phenyltetrahydroimidazole, separating the solution containing soluble streptomycin salt, and recovering stretomycin therefrom.

There is also discovered, according to the present invention, the process of reacting 1,3-dibenzyl-2-streptomycyl-tetrahydroimidazole in about one equivalent aqueous mineral acid with substantially one equivalent of benzaldehyde to precipitate 1,3-dibenzyl-2-phenyltetrahydroimidazole, separating the solution containing soluble streptomycin salt, hydrogenating the solution, and recovering dihydrostreptomycin therefrom.

The 2-streptomycyltetrahydroimidazoles used as reagents in the process of the present invention have the formula

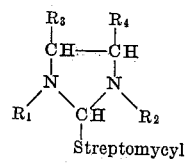

wherein R$_3$ and R$_4$ are hydrogen or methyl and R$_1$ and R$_2$ are alkyl, cycloalkyl, aralkyl, substituted aralkyl, phenyl, or substituted phenyl. They are used as free bases or, preferably, as acid addition salts. Such a compound is reacted in aqueous acid, preferably mineral acid such as sulfuric acid, at about room temperature for a period of five minutes to five hours. For convenience and to facilitate reaction with the aromatic aldehyde, the aqueous acid may also contain a water-soluble organic solvent such as methanol but this is not essential. The final reagent is an aromatic aldehyde, such as benzaldehyde, parachlorobenzaldehyde or fufuraldehyde, which is selected on the basis of a simple test demonstrating that it reacts with an N,N'-disubstituted-ethylenediamine to form a water-insoluble 1,3-disubstituted-2-aryltetrahydroimidazole.

After removal of the precipitated 1,3-disubstituted-2-aryltetrahydroimidazole by filtration, there remains a solution of purified streptomycin, e. g. as the sulfate. This streptomycin is recovered by the known methods, e. g. by lyophilization or by precipitation by methanol. Alternatively, this solution of streptomycin is hydrogenated directly to dihydrostreptomycin, which is isolated by methods known to the art, e. g. by precipitation as the sulfate.

Further understanding of the invention may be obtained by reference to the following examples, which are illustrative only and are not the exclusive embodiment of the invention. I wish it to be understood that I do not desire to be limited to the exact details shown and described, for obvious modifications will occur to persons skilled in the art.

Example 1

Streptomycin sulfate (491 g., 0.675 mole) was dissolved with stirring in 1675 ml. water, filtered and the filtrate combined with 200 ml. water used to wash the filter.

N,N' - dibenzylethylenediamine diacetate (487 g., 1.35 moles) was suspended in 1000 ml. of water and neutralized with 50% aqueous sodium hydroxide. After standing, the lower aqueous layer was separated and discarded. The pale yellow, liquid amine was washed with water (500 ml.), separated from the wash water, dissolved in one liter methanol and added to the aqueous solution of streptomycin sulfate with stirring. The mixture was heated 10 minutes at 32°–45° C. and then 20 minutes at 45°–52° C. After cooling to 3° C., the crystalline 1,3 - dibenzyl - 2 - streptomycyl - tetrahydroimidazole sulfate which had precipitated was collected by filtration and the filter cake was washed with 1350 ml. chilled methanol and air-dried, weighing 500 g. This product was combined with an additional 200 g. prepared in similar fashion and well mixed. The 1,3-dibenzyl-2-streptomycyl-tetrahydroimidazole sulfate assayed 624, 604, 610 u./mgm.

(theory for C$_{37}$H$_{57}$N$_9$O$_{11}$·H$_2$SO$_4$·2H$_2$O:620)

and melted about 250°–252° C. (d).

*Analysis.*—Calculated for $C_{37}H_{57}N_9O_{11} \cdot H_2SO_4 \cdot 2H_2O$:

|   | Calculated | Found |
|---|---|---|
| C | 47.3 | 47.2 |
| H | 6.77 | 6.73 |
| S | 3.42 | 3.29; 3.44 |
| $H_2O$ | 3.84 | | loss of water at 80° C. over $P_2O_5$, 3.14; pick-up of water of anhydrous salt, 4.05, 4.15; residue 0.8%.

The pH of a saturated aqueous solution at room temperature of this 1,3-dibenzyl-2-streptomycyl-tetrahydroimidazole sulfate was 8.8.

Example 2

N,N′ - dibenzylethylenediamine diacetate (1683 g., 4.67 moles) was suspended in 3330 ml. of water and with vigorous mechanical stirring neutralized to pH 10–11 with about 500–525 ml. 50% aqueous sodium hydroxide.

The liberated base was separated, washed with 1.5 l. of water, dissolved in 6650 ml. of methanol and this solution was added rapidly to a mechanically stirred, filtered solution of streptomycin sulfate (1637 g.; 2.25 moles; potency 718 u./mgm. by maltol and 651 u./mgm. by bio-assay; 2.5% streptomycin B by activity; 9.3% streptomycin B by weight; 6.55% moisture content) in 5585 ml. of water. After heating to about 50° C. in the course of about 35 minutes, the mixture was cooled to 6° C. and the precipitated 1,3-dibenzyl-2-streptomycyl-tetrahydroimidazole sulfate was collected by filtration, washed with 4.5 l. chilled methanol, air-dried and combined with the product obtained from two other essentially duplicate runs; total weight 4849 g. The average potency of the product was 594 u./mgm. by bio-assay and 599 u./mgm. by maltol. The product melted about 245°–250° C. (browns at 180° C., sinters around 240° C.). The product contained 1.3% streptomycin B by activity and 5% by weight. The product contained 1.3% residue and 3.78% moisture. The pH of a saturated aqueous suspension of the product at room temperature was 8.9. A sample was dried at 80° C. in vacuo over $P_2O_5$.

*Analysis.*—Calculated for $C_{37}H_{57}N_9O_{11} \cdot H_2SO_4$:

|   | Calculated | Found |
|---|---|---|
| C | 49.27 | 48.7 |
| H | 6.59 | 6.56 |
| S | 3.55 | 3.79 |

Example 3

9.38 grams (0.01 mole) of 1,3-dibenzyl-2-streptomycyltetrahydroimidazole sulfate prepared from streptomycin sulfate bio-assaying 651 units/mgm. was suspended in 25 ml. methanol and there was added in turn 25 ml. of water containing one equivalent of sulfuric acid and 1.1 ml. (0.011 mole) benzaldehyde. As the mixture was shaken vigorously, most of the solid dissolved and a new solid, 1,3 - dibenzyl - 2 - phenyltetrahydroimidazole, separated, was collected by filtration after twenty minutes, washed with 5 ml. water and allowed to dry to constant weight at room temperature, giving 3.26 grams (99.5% yield).

The filtrate was poured into 150 ml. methanol and the colorless precipitate of streptomycin sulfate was collected by filtration, dried in vacuo over $P_2O_5$ and found to weigh 6.25 g. (86.5% yield), average bio-assay 725 units/mgm.

Example 4

9.38 grams (0.01 mole) of 1,3-dibenzyl-2-streptomycyltetrahydroimidazole sulfate prepared from streptomycin sulfate bio-assaying 651 units/mgm. was suspended in 25 ml. methanol and there was added in turn, with cooling to maintain the mixture at room temperature 25 ml. of water containing one equivalent of sulfuric acid and one equivalent of acetic acid and then 1.10 ml. (0.011 mole) benzaldehyde. After fifteen minutes, the 1,3-dibenzyl-2-streptomycyl-tetrahydroimidazole sulfate had dissolved (i. e. reacted) and the solid 1,3-dibenzyl-2-phenyltetrahydroimidazole was collected by filtration, washed with two 5 ml. portions of water and dried in air to a constant weight of 1.82 g. (55.5% yield).

The filtrate was poured into 200 ml. methanol and the colorless precipitate of streptomycin sulfate was collected by filtration, dried in vacuo over $P_2O_5$ and found to weigh 7.85 g., average bio-assay 740 units/mgm.

Two similar runs, with the indicated changes, gave the results tabulated below:

| Solvent | Reaction Time, min. | Yield of 1,3-dibenzyl-2-phenyl-tetrahydroimidazole, percent | Streptomycin Sulfate | |
|---|---|---|---|---|
| | | | Yield, g. | Bio-assay, units/mgm. |
| 50 ml. 50% aqueous methanol | 30 | 72 | 7.02 | 732 |
| 25 ml. water | 15 | 64 | 7.82 | 732 |

I claim:

1. The process of reacting a 2-streptomycyl-tetrahydroimidazole having the formula

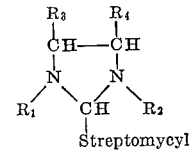

wherein $R_3$ and $R_4$ are members selected from the group consisting of hydrogen and methyl and $R_1$ and $R_2$ are members selected from the group consisting of alkyl, cycloalkyl, aralkyl, substituted aralkyl, phenyl and substituted phenyl in aqueous acid with an aromatic aldehyde to precipitate the corresponding 2-aryl-tetrahydroimidazole, and separating the solution containing soluble streptomycin salt.

2. The process of reacting 1,3-dibenzyl-2-streptomycyl-tetrahydroimidazole in aqueous acid with an aromatic aldehyde to precipitate 1,3-dibenzyl-2-aryl-tetrahydroimidazole, and separating the solution containing soluble streptomycin salt.

3. The process of reacting 1,3-dibenzyl-2-streptomycyl-tetrahydroimidazole in aqueous mineral acid with benzaldehyde to precipitate 1,3-dibenzyl-2-phenyl-tetrahydroimidazole, and separating the solution containing soluble streptomycin salt.

4. The process of reacting 1,3-dibenzyl-2-streptomycyl-tetrahydroimidazole in about one equivalent aqueous mineral acid with substantially one equivalent of benzaldehyde to precipitate 1,3-dibenzyl-2-phenyltetrahydroimidazole, separating the solution containing soluble streptomycin salt, and recovering streptomycin therefrom.

5. The process of reacting 1,3-dibenzyl-2-streptomycyl-tetrahydroimidazole in about one equivalent aqueous mineral acid with substantially one equivalent of benzaldehyde to precipitate 1,3-dibenzyl-2-phenyltetrahydroimidazole, separating the solution containing soluble streptomycin salt, hydrogenating the solution, and recovering dihydrostreptomycin therefrom.

6. The process of reacting 1,3-dibenzyl-2-streptomycyl-tetrahydroimidazole sulfate in about one equivalent of dilute aqueous sulfuric acid at about room temperature for at least ten minutes with substantially one equivalent of benzaldehyde to precipitate 1,3-dibenzyl-2-phenyltetrahydroimidazole and separating the solution of streptomycin sulfate.

References Cited in the file of this patent
UNITED STATES PATENTS
2,607,770   Winsten   Aug. 19, 1952